United States Patent
Kujawski, Jr.

(10) Patent No.: US 10,132,437 B2
(45) Date of Patent: Nov. 20, 2018

(54) FLUID CONNECTOR WITH A SWIVEL BODY

(71) Applicant: Jiffy-tite Co., Inc., Lancaster, NY (US)

(72) Inventor: James A. Kujawski, Jr., Attica, NY (US)

(73) Assignee: Oetiker NY, Inc., Lancaster, NY (US)

( * ) Notice: Subject to any disclaimer, the term of this patent is extended or adjusted under 35 U.S.C. 154(b) by 666 days.

(21) Appl. No.: 14/561,671

(22) Filed: Dec. 5, 2014

(65) Prior Publication Data

US 2016/0161035 A1    Jun. 9, 2016

(51) Int. Cl.

| F16L 21/03 | (2006.01) |
|---|---|
| F16L 21/08 | (2006.01) |
| F16L 27/06 | (2006.01) |
| F16L 37/14 | (2006.01) |
| F16L 27/073 | (2006.01) |
| F16L 37/52 | (2006.01) |

(52) U.S. Cl.
CPC .......... *F16L 37/144* (2013.01); *F16L 27/073* (2013.01); *F16L 37/52* (2013.01)

(58) Field of Classification Search
CPC ....... F16L 27/04; F16L 27/044; F16L 27/047; F16L 27/06; F16L 37/08–37/20; F16L 37/52; F16L 21/03
USPC ........ 285/145.3, 146.1, 261–263, 271, 272.1
See application file for complete search history.

(56) References Cited

U.S. PATENT DOCUMENTS

| 406,561 | A | * | 7/1889 | Buchananm | ............ | F16L 27/06 |
|---|---|---|---|---|---|---|
| | | | | | | 285/271 |
| 787,391 | A | * | 4/1905 | Niederlander | ........ | F16L 15/001 |
| | | | | | | 285/110 |
| 1,132,123 | A | * | 3/1915 | Royer et al. | .......... | F16L 37/252 |
| | | | | | | 285/271 |
| 2,151,833 | A | * | 3/1939 | Bugatti | ................. | F16L 27/053 |
| | | | | | | 285/271 |
| 2,421,691 | A | * | 6/1947 | Gibson, Jr. | ........... | F16L 27/026 |
| | | | | | | 285/101 |
| 2,473,502 | A | * | 6/1949 | Bard | ..................... | F16L 27/067 |
| | | | | | | 277/390 |
| 3,454,288 | A | * | 7/1969 | Mancusi, Jr. | ........... | F16L 27/04 |
| | | | | | | 277/507 |

(Continued)

*Primary Examiner* — David Bochna
*Assistant Examiner* — Stacy N Lawson
(74) *Attorney, Agent, or Firm* — Simpson & Simpson PLLC

(57) ABSTRACT

A fluid connector comprising a base having a first through-hole concentrically positioned therein, the base comprising a first inner surface and a first outer surface, the base comprising at least one annular groove extending radially outwardly from the first inner surface, at least one ring-shaped seal, each seal located within the at least one annular groove, a washer positioned within the first through-hole, the washer having an inwardly facing partially spherical surface, and, a body having a second through-hole positioned therein, the body comprising a second inner surface and a second outer surface, wherein the second outer surface is partially spherical in shape, wherein the second outer surface of the body engages the at least one seal and the inwardly facing partially spherical surface of the washer, wherein the body is arranged to swivel within the second through-hole, and to pass fluid through the second through-hole.

19 Claims, 10 Drawing Sheets

(56) References Cited

U.S. PATENT DOCUMENTS

| | | | |
|---|---|---|---|
| 3,515,414 A * | 6/1970 | Kowalewski | F16L 1/161 285/145.3 |
| 4,005,881 A * | 2/1977 | Burton | F16L 27/053 285/111 |
| 4,139,221 A * | 2/1979 | Shotbolt | B23Q 1/0027 285/18 |
| 4,186,950 A * | 2/1980 | Billingsley | F16L 27/053 285/270 |
| 4,776,617 A | 10/1988 | Sato | |
| 5,160,176 A | 11/1992 | Gale | |
| 5,507,534 A * | 4/1996 | Reifenberger | F16L 27/04 285/122.1 |
| 5,749,606 A * | 5/1998 | Lu | F16L 37/088 285/305 |
| 7,237,808 B2 | 7/2007 | Porter | |
| 7,270,348 B2 | 9/2007 | Parrott | |
| 2004/0245777 A1 * | 12/2004 | Vila | F16L 27/047 285/261 |
| 2005/0012329 A1 | 1/2005 | Brown | |
| 2005/0211444 A1 * | 9/2005 | Kauffman | E21B 17/05 166/380 |
| 2009/0226243 A1 * | 9/2009 | Krywitsky | F16L 27/06 403/38 |
| 2010/0156096 A1 * | 6/2010 | Challender | F16L 27/06 285/261 |
| 2013/0125989 A1 * | 5/2013 | Clever | B67D 7/3218 137/1 |

* cited by examiner

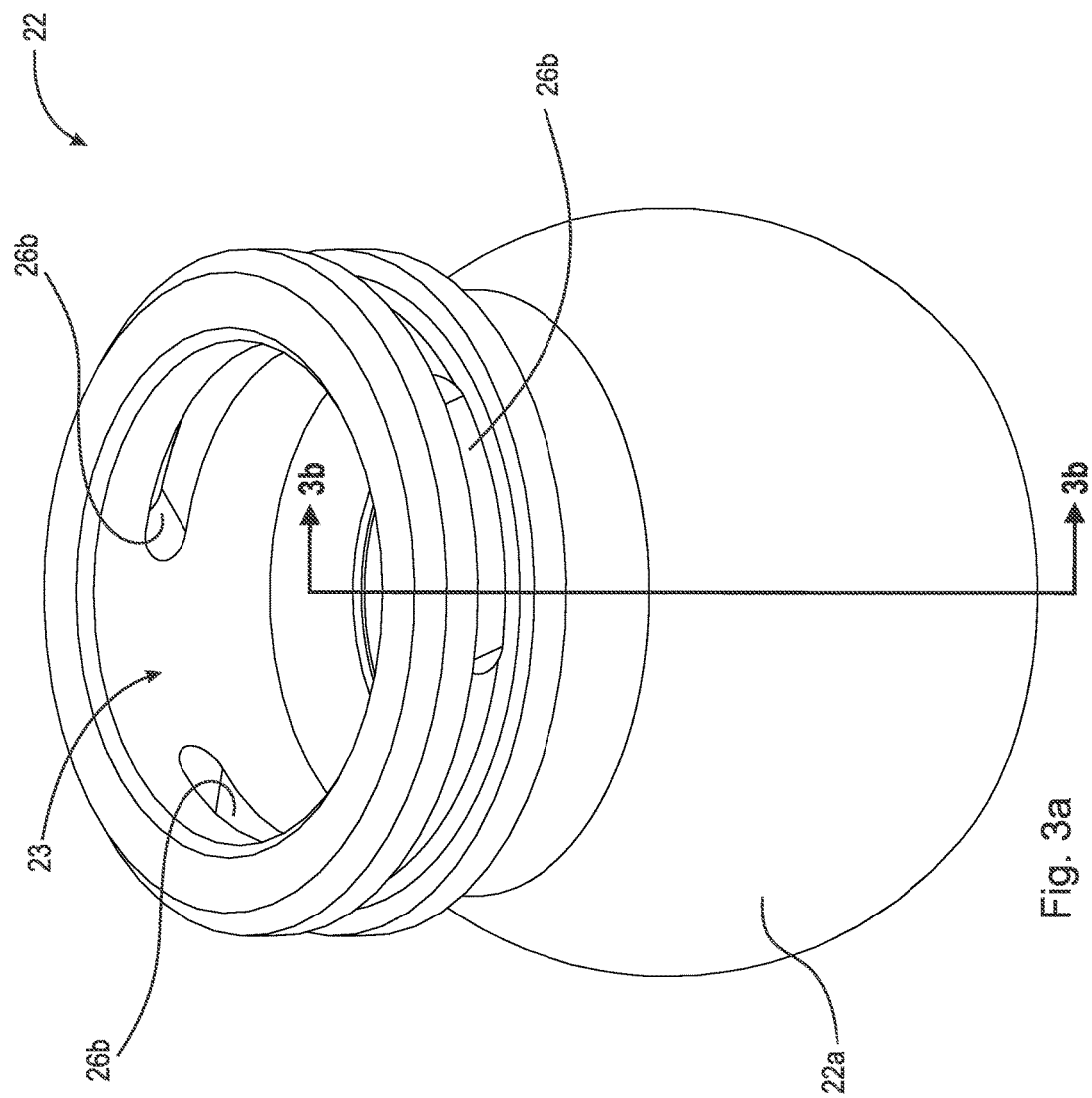

FLUID CONNECTOR WITH A SWIVEL BODY

FIELD OF THE INVENTION

The invention relates generally to a fluid connector, and, more specifically, to a fluid connector with a body which allows for swiveling of the body to prevent excessive stress and strain on the fluid connector.

BACKGROUND OF THE INVENTION

Fluid connectors are integral components for automotive applications. Since an automotive system is made up of various components such as a radiator, transmission, and engine, fluid must be able to travel not only within each component but also between components. An example of fluid traveling between components is the transmission fluid traveling from the transmission to the transmission oil cooler in order to lower the temperature of the transmission fluid. Fluid predominantly moves between components via flexible or rigid hoses which connect to each component by fluid connectors.

Fluid connectors are typically configured in a fixed orientation with respect to inlet and outlet, regardless of what vehicle they are used in, and regardless of what components they are intended to connect, and regardless of where those components may be located in different vehicles. This fixed, rigid configuration causes complications for the positioning of fluid hoses since the hoses must be bent and contorted in order to fit properly. If a fluid hose is bent or contoured in excess, this can place excessive stress and strain on the connection between the fluid connector and the fluid hose, causing the connection to become weak. Additionally, the connection between the fluid connector and fluid hose may leak fluid due to an improper fit which in turn could cause excessive fluid loss of critical components such as the engine, causing overheating and possible damage if not discovered and fixed.

A possible solution to this problem would be to install angled fluid connectors which would direct the fluid hose in the appropriate direction. Unfortunately, if the angle at which the fluid connector is bent is also fixed, this doesn't solve the problem if the connected components are rearranged in a new configuration.

Another possible solution to this problem is disclosed in U.S. Patent Application Publication No. 2005/0012329 (Brown). Brown discloses a swivel fitting for two pipes where one of the pipes has a substantially concave end and the other pipe has a substantially convex end, with the one pipe fitting into the other. Unfortunately, Brown fails to disclose a type of securement means other than the concave seal itself. If excessive force is placed on the swivel fitting, the seal will fail and fluid passing through the fitting may potentially leak. Additionally, Brown fails to disclose a method of securing the fitting to a fluid transfer component.

Thus, there has been a long-felt need for a fluid connector which allows for various mounting angles with a fluid hose, where the mounting angle can be adjusted depending on the application.

BRIEF SUMMARY OF THE INVENTION

The present invention broadly comprises a fluid connector, comprising a base having a first through-hole concentrically positioned therein, the base comprising a first inner surface and a first outer surface, the base comprising at least one annular groove extending radially outwardly from the first inner surface, at least one ring-shaped seal, each seal located within the at least one annular groove, a washer positioned within the first through-hole, the washer having an inwardly facing partially spherical surface, and, a body having a second through-hole positioned therein, the body comprising a second inner surface and a second outer surface, wherein the second outer surface is partially spherical in shape, wherein the second outer surface of the body engages the at least one seal and the inwardly facing partially spherical surface of the washer, wherein the body is arranged to swivel within the second through-hole, and to pass fluid through the second through-hole.

Additionally, the present invention comprises a fluid connector, comprising a base, the base comprising a first through-hole concentrically positioned therein, the base further comprising a first inner surface and a first outer surface, and at least one annular groove extending radially outwardly from the first inner surface, at least one ring-shaped seal, each seal located within the at least one annular groove, a washer positioned within the first through-hole, the washer having an inwardly facing partially spherical surface, a body having a second through-hole positioned therein, the body comprising a second inner surface and a second outer surface, wherein the second outer surface is partially spherical in shape, wherein the second outer surface of the body engages the at least one seal and the inwardly facing partially spherical surface of the washer, wherein the body is arranged to swivel within the second through-hole, and to pass fluid through the second through-hole, the connector further comprising a retainer clip fixedly secured to the body, the retainer clip positioned within the second through-hole.

Additionally, the present invention comprises a fluid connector, comprising a base, the base comprising a first through-hole concentrically positioned therein, the base comprising a first inner surface and a first outer surface, the base comprising a first annular groove and a second annular groove extending radially outwardly from the first inner surface, a first ring-shaped seal, the first seal located within the first annular groove, a second ring-shaped seal, the second seal located within the second annular groove, a washer positioned within the first through-hole, the washer having an inwardly facing partially spherical surface, a body having a second through-hole positioned therein, the body comprising a second inner surface and a second outer surface, wherein the second outer surface is partially spherical in shape, wherein the second outer surface of the body engages the at least one seal and the inwardly facing partially spherical surface of the washer, wherein the body is arranged to swivel within the second through-hole, and to pass fluid through the second through-hole and, a retainer clip fixedly secured to the body, the retainer clip positioned within the second through-hole, the retainer clip arranged to secure a connector tube to the fluid connector.

A primary object of the invention is to provide a fluid connector which can swivel at various angles to prevent excessive stress and strain on the joint between the fluid connector and a hose connected thereto which could lead to failure of the seals within the fluid connector, or a failure of the connecting hose.

These and other objects, features and advantages of the present invention will become readily apparent upon a review of the following detailed description of the invention, in view of the drawings and appended claims.

BRIEF DESCRIPTION OF THE DRAWINGS

The nature and mode of operation of the present invention will now be more fully described in the following detailed description of the invention taken with the accompanying figures, in which:

FIG. 2b is a cross-sectional view of base 24 taken generally along line 2b in FIG. 2a;

FIG. 3a is a perspective view of body 22;

FIG. 3b is a cross-sectional view of body 22 taken generally along line 3b in FIG. 3a;

FIG. 4b is a cross-sectional view of washer 29 taken generally along line 4b in FIG. 4a;

DETAILED DESCRIPTION OF THE INVENTION

At the outset, it should be appreciated that like drawing numbers on different drawing views identify identical, or functionally similar, structural elements of the invention. It is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention.

Unless defined otherwise, all technical and scientific terms used herein have the same meaning as commonly understood to one of ordinary skill in the art to which this invention pertains. It should be understood that any methods, devices or materials similar or equivalent to those described herein can be used in the practice or testing of the invention. The assembly of the present invention could be driven by hydraulics, electronics, and/or pneumatics.

Figure 1:
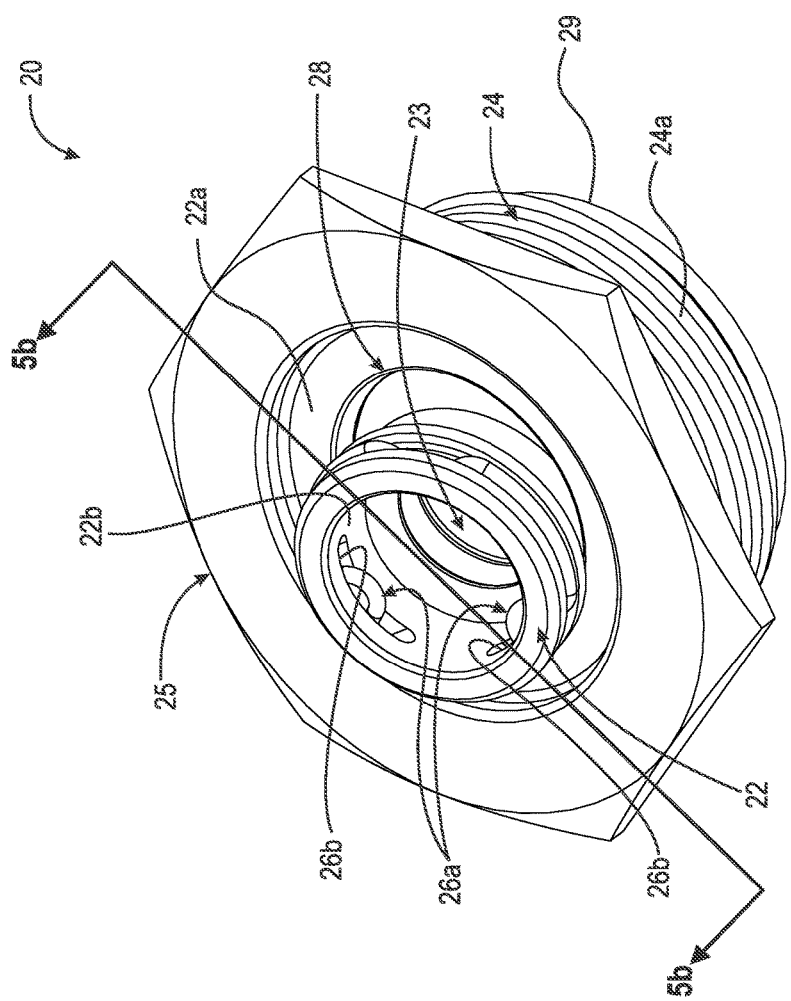
FIG. 1 is a perspective view of fluid connector 20 of the present invention.

Adverting now to the figures, FIG. 1 is a perspective view of fluid connector 20. Fluid connector 20 broadly comprises body 22, base 24, and washer 29 (shown in more detail in FIG. 4a). As shown in the figure, body 24 comprises through-hole 23 which allows a fluid to pass through body 22. Additionally, retainer clip 26a is arranged within apertures 26b and secure tube 50 to body 22 (shown in FIG. 6). Base 24 comprises through-hole 28 which allows body 22 to be mounted within base 24. It should be noted that through-hole 28 has a substantially larger diameter than the diameter of through-hole 23. This difference in diameter allows body 22 to swivel within base 24 while still remaining sealed for fluid transfer. In a preferred embodiment, surface 24a is threaded to secure base 24 to a fluid transfer component such as a radiator or transmission (not shown). It should be appreciated, however, that the use of different securement methods is possible and considered to be within the scope of the invention as claimed. For example, surface 24a of base 24 could be a smooth surface which allows fluid connector 20 to be press fit into a fluid transfer component using an interference fit. Rim 25 is secured to base 24 and prevents fluid connector 20 from being inserted too far within a fluid transfer component which could affect the strength of the connection between surface 24a of base 24 and a fluid transfer component (not shown). Additionally, seal 40 (shown in FIG. 5a) is operatively arranged between lip 25 and surface 24a and aids in additional sealing fluid connector 20 with a fluid transfer component (not shown).

Figure 2A:
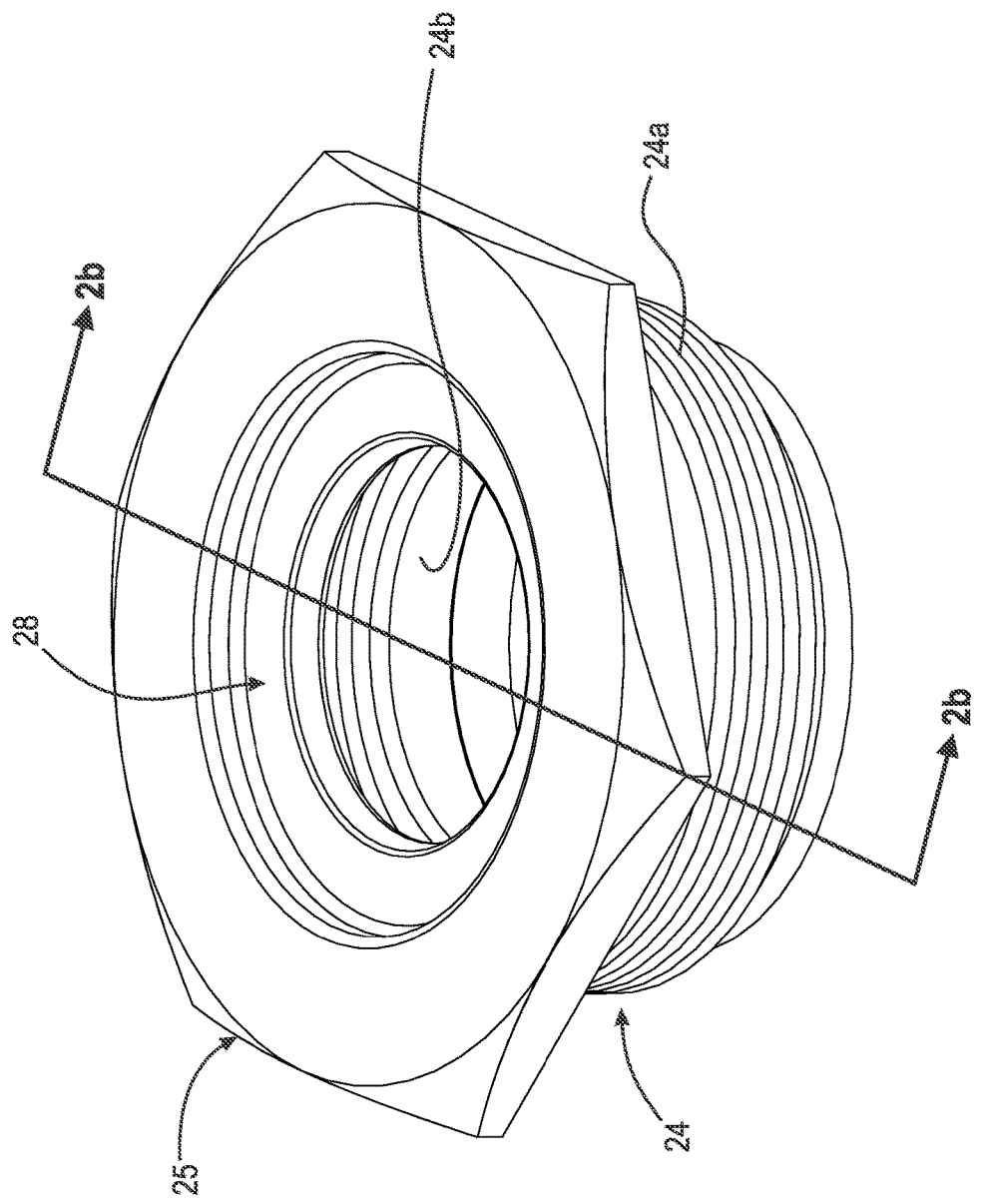
FIG. 2a is a perspective view of base 24.
Figure 2B:
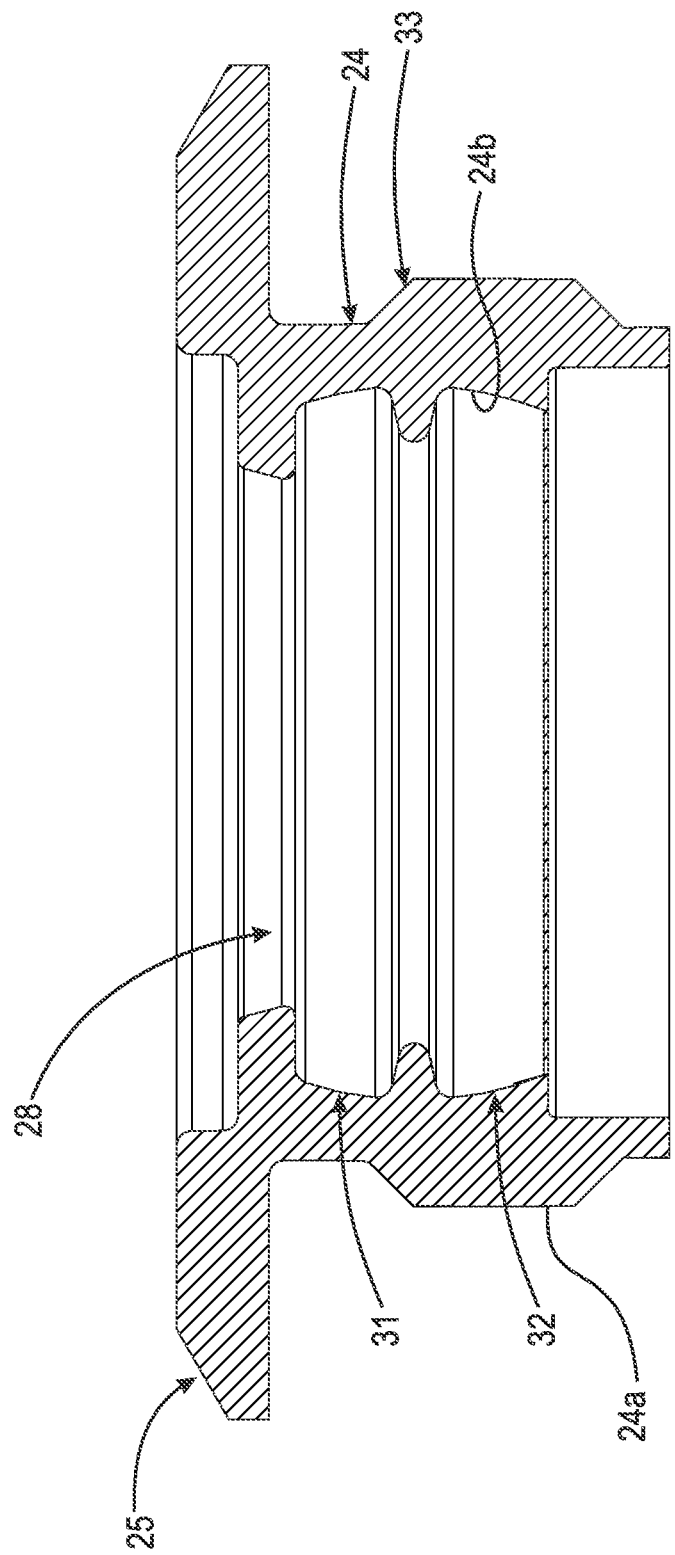

FIGS. 2a and 2b are a perspective view and cross-sectional view, respectively, of base 24. The cross-section is taken generally along line 2b in FIG. 2a. As shown in the figures, surface 24b of base 24 comprises groove 31 and groove 32 which allow for a seal to be placed within each to seal the connection between body 22 and base 24. Groove 31 and groove 32 are substantially similar to one another and are operatively arranged to allow for sealing of body 22 with base 24. Additionally, base 24 comprises rim 33 which comprises screw threads that are operatively arranged on rim 33 in a preferred embodiment. Lip 25 has a substantially larger diameter than base 24 in ensure base 24 is secured properly to a fluid transfer component (not shown).

Figure 3B:
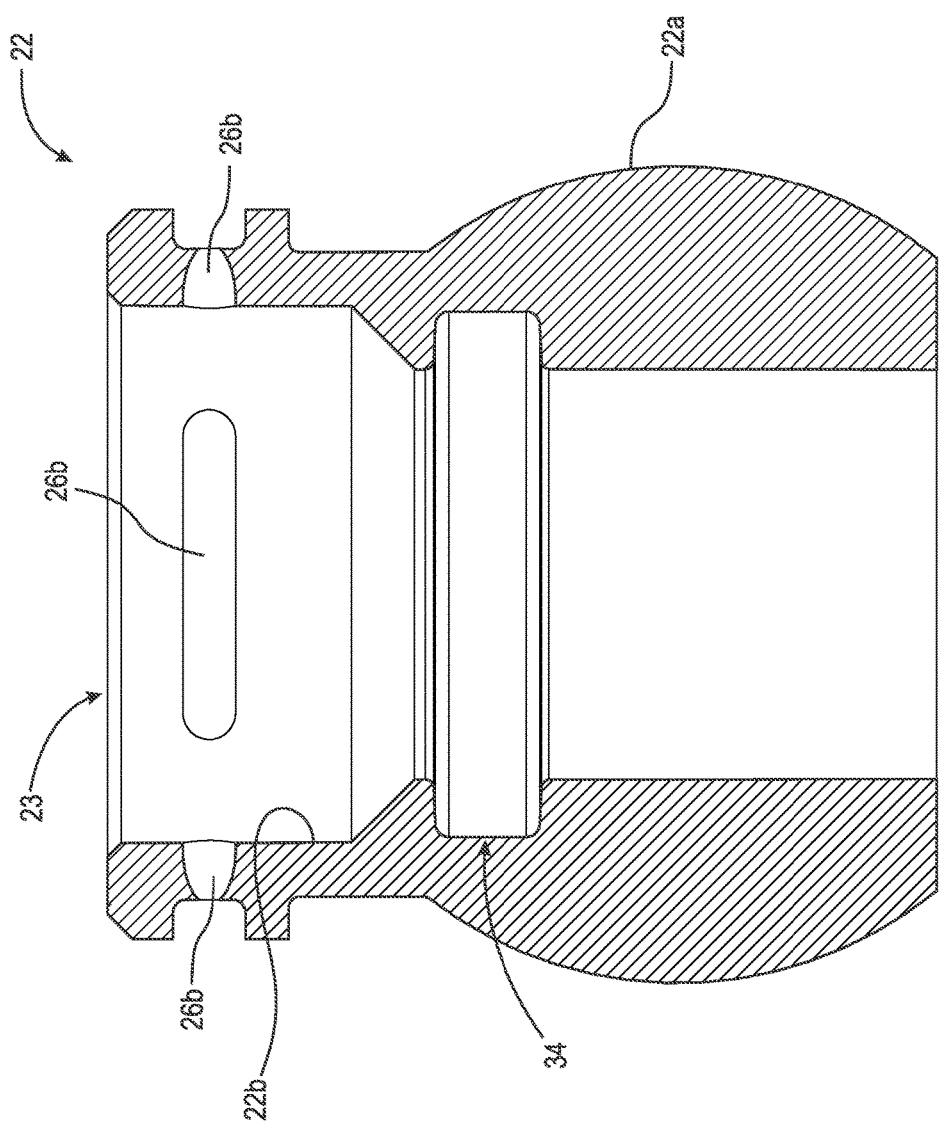

FIGS. 3a and 3b are a perspective view and cross-sectional view, respectively, of body 22. The cross-section is taken generally along line 3b in FIG. 3a. In a preferred embodiment, surface 22a of body 22 is partially spherical which allows body 22 to pivot approximately a maximum of 25 degrees from centerline 60 (shown in FIG. 5a) while being mounted within base 24. It should be appreciated, however, that the use of different shapes for surface 22a is possible and considered to be within the scope of the invention as claimed. For example, surface 22a of body 22 could be partially elliptically shaped which would still allow movement of body 22 within base 24. The greatest range of movement is achieved by having surface 24 partially spherically shaped compared to any other type of shape which could be used for surface 22a. Body 22 comprises aperture 23 where tube 50 (shown in FIG. 6) is inserted and secured via retainer clip 26a (shown in FIG. 1) which is mounted within apertures 26b. Groove 34 is arranged on surface 22b and allows seal 46 (shown in FIG. 5b) to be operatively arranged therein to further seal the connection between tube 50 (shown in FIG. 6) and surface 22b of body 22.

Figure 4A:
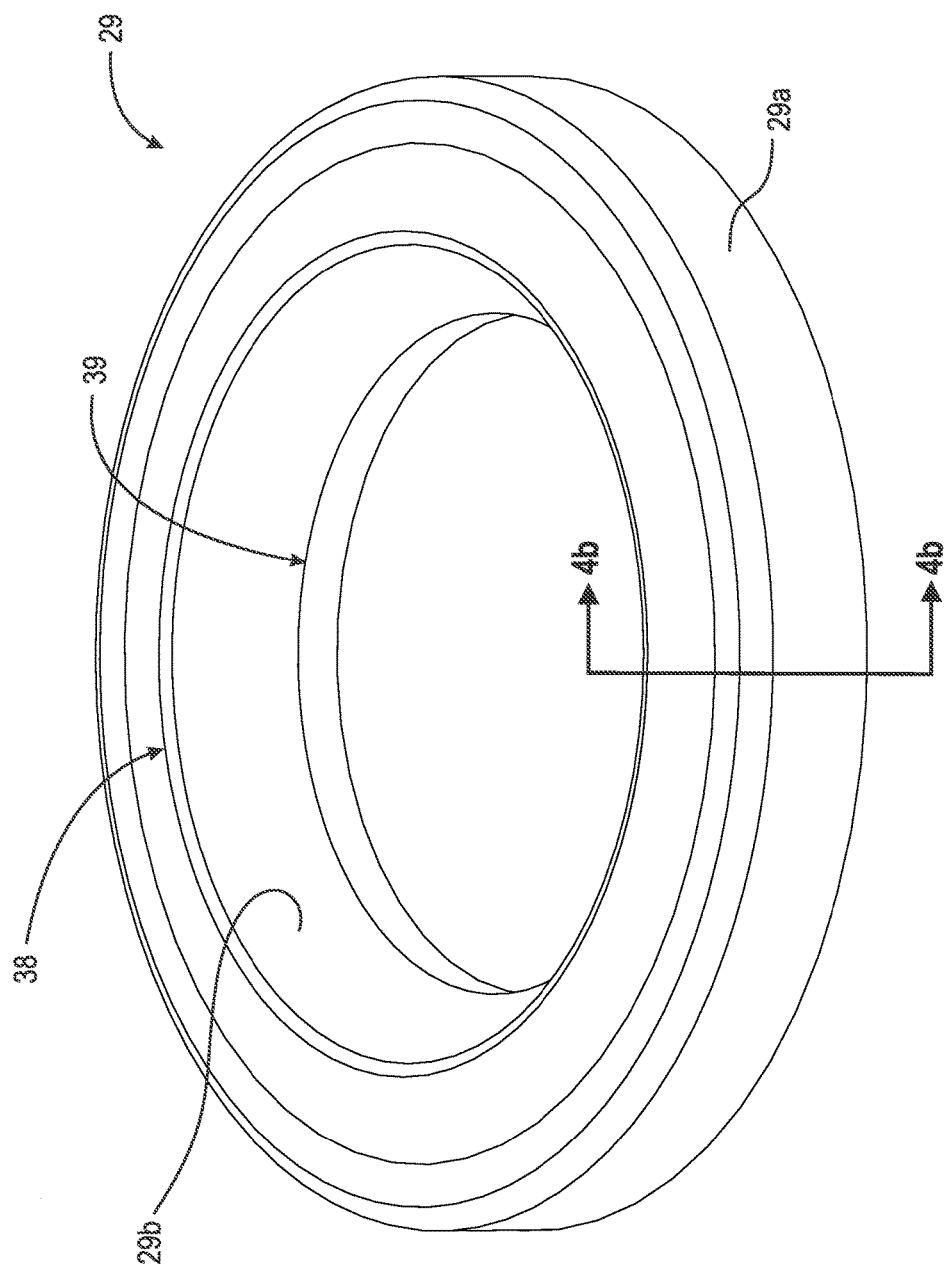
FIG. 4a is a perspective view of washer 29.
Figure 4B:
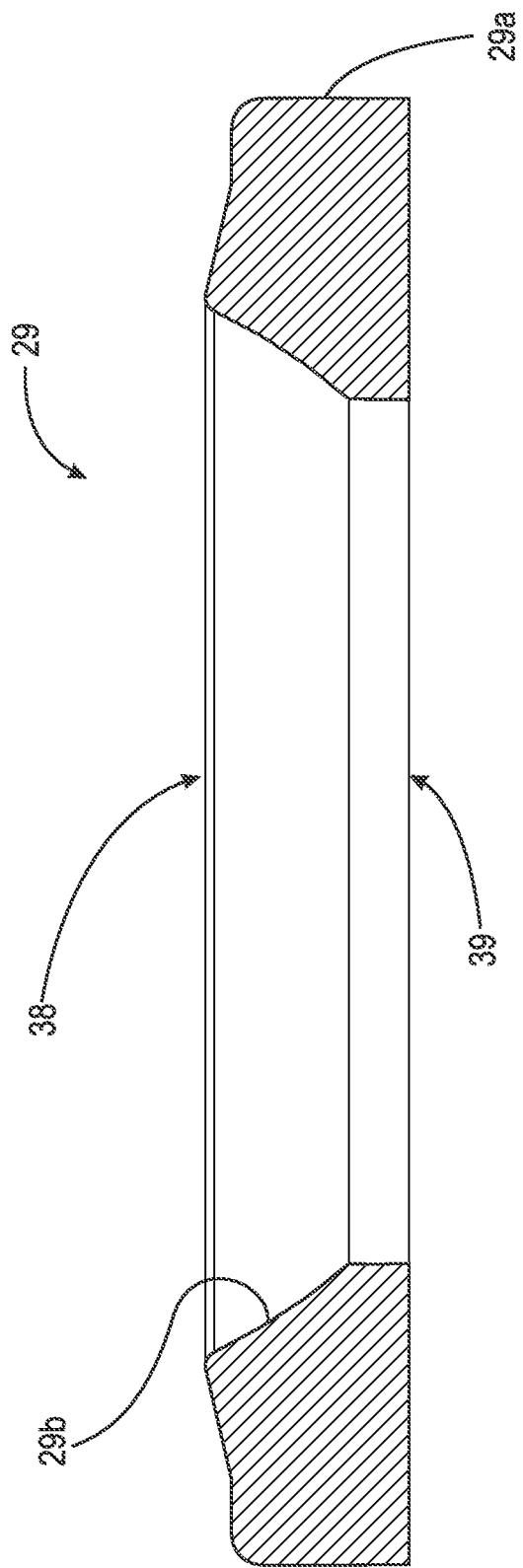

FIGS. 4a and 4b are a perspective view and cross-sectional view, respectively, of washer 29. The cross-section is taken generally along line 4b in FIG. 4a. Washer 29 broadly comprises aperture 38, aperture 39, surface 29a, and surface 29b. Washer 29 secures within through-hole 28 of base 24 in order secure body 22 within base 24. As shown in the figure, aperture 39 has a smaller diameter than the diameter of aperture 38. Surface 29b connects both aperture 38 and 39 and has a contour which matches that of the shape of surface 22a of body 22. The contour of surface 29b secures body 22 within base 24 and allows body 22 to swivel within base 24 while still having fluid connector 20 sealed for fluid transfer. Surface 29a of washer 29 engages surface 22b of base 24 in order to seal body 22 within base 24 (shown in FIG. 5b).

Figure 5A:
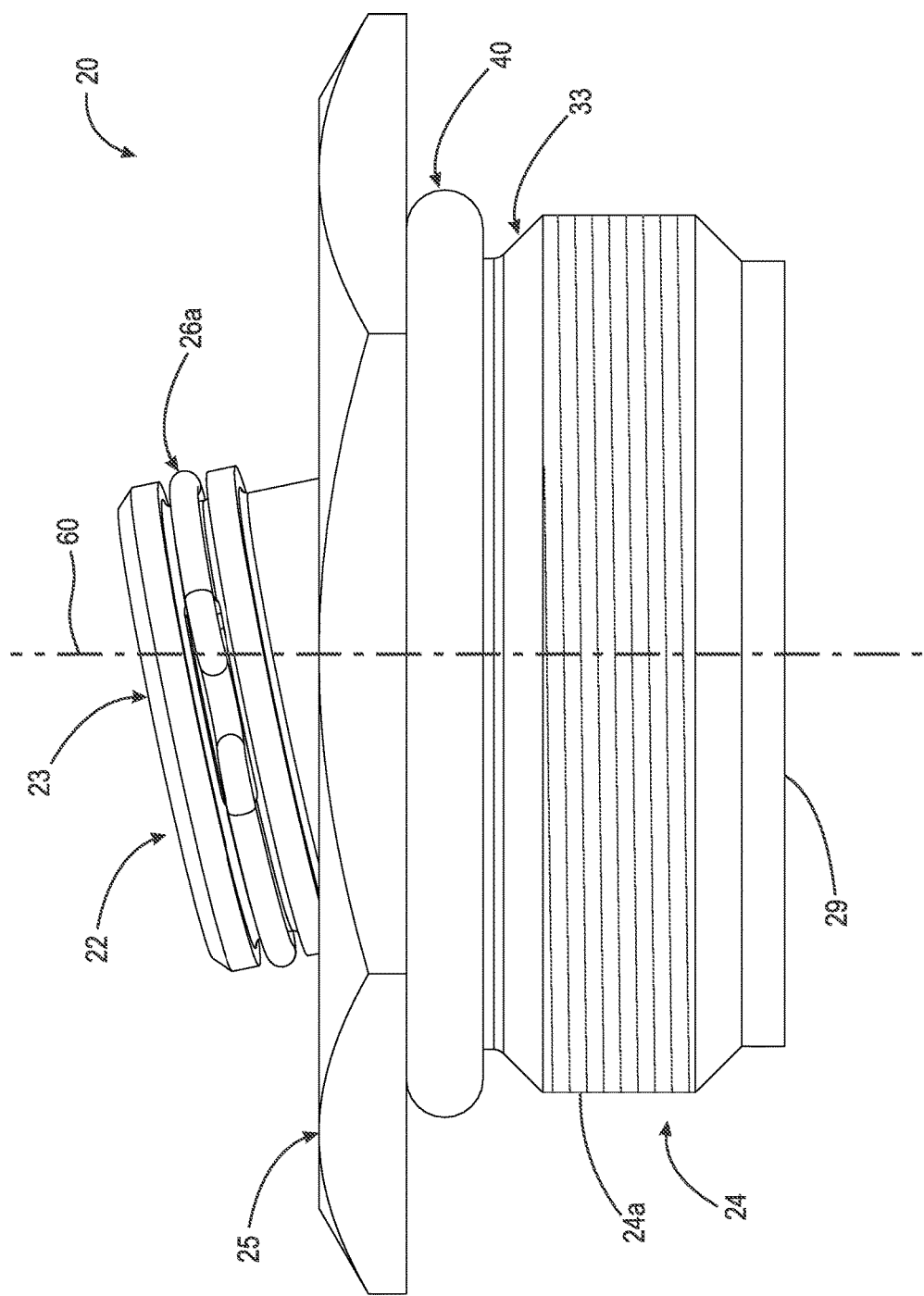
FIG. 5a is a side view of fluid connector 20 with body 22 rotated within base 24.

FIG. 5a is a perspective view of fluid connector 20. As shown in the figures, body 22 is arranged to swivel with respect to centerline 60, which prevents additional stress and strain on the connection between tube 50 (shown in FIG. 6) and body 22 if an angled connection is required to connect certain fluid transfer components such as a transmission with a radiator. In FIG. 5a, the body is shown tilted leftwardly with respect to centerline 60. It is important to note that body 22 can swivel in all directions, with the range of movement limited to the size of through-hole 28, through-hole 26, and the shape of surface 22b. Seal 40 is arranged between rim 25 and rim 33. As fluid connector 20 is secured to a fluid transfer component via screw threads arranged on surface 24a, seal 40 is compressed between rim 25 and the housing of the fluid transfer component (not shown), further sealing the outer surface of fluid connector 20 to ensure fluids only travel through through-hole 23 of body 22.

Figure 5B:
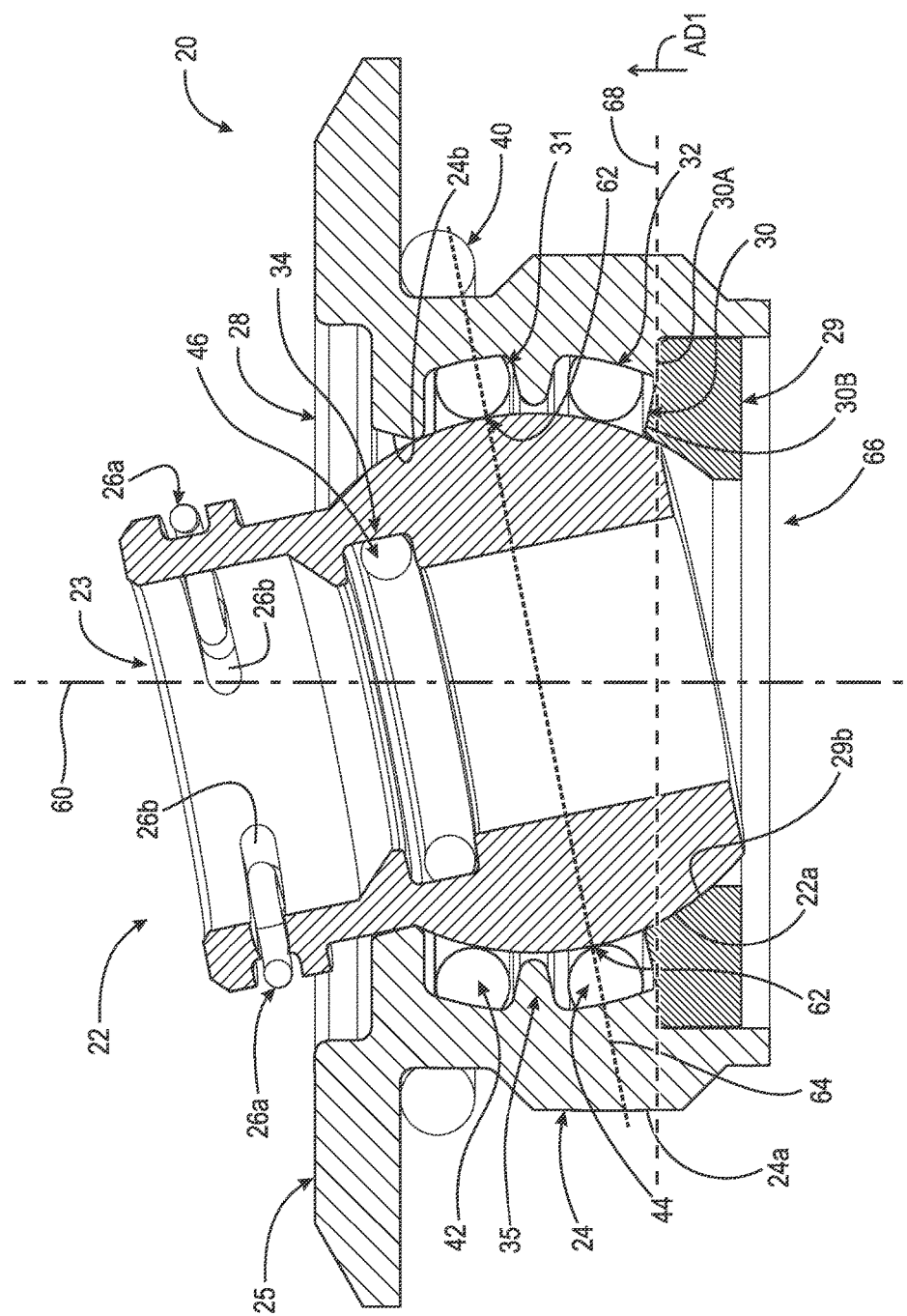
FIG. 5b is a cross-sectional view of fluid connector 20 with body 22 rotated within base 24 taken generally long line 5b in FIG. 1; and, FIG. 6 is a perspective view of fluid connector 20 with tube 50 secured to body 22.

FIG. 5b is a cross-sectional view of fluid connector 20 taken generally along line 5b in FIG. 1. As shown in the figure, seals 42 and 44 and operatively arranged within grooves 31 and 32, respectively. Seals 42 and 44 are compressed between body 22 and base 24 which prevents fluid from leaking out of fluid connector 20 from the connection between body 22 and base 24. Additionally, seals 42 and 44 engage surface 22a of body 22 and allow body 22 to swivel within base 24 while remaining sealed. It can also be seen that surface 22a of body 22 and surface 29b of washer 29 are complementary and allow body 22 a range of motion. Washer 29 is arranged at end 66 of base 24. Washer further comprises angled surface 30 which is arranged at least partially within groove 32. Axis 68 is perpendicular to centerline 60 of first through-hole 28. Angled surface 30 comprises first section 30A, which is coplanar with axis 68, and second section 30B which is angled in axial direction AD1 toward seal 44. In some embodiments, second section 30B is arranged at an angle relative to first section 30A that is less than 90 degrees. In a preferred embodiment, seals 40, 42, 44, and 46 are rubber O-rings. It should be appreciated, however, that the use of different types of seals is possible and considered to be within the scope of the invention as claimed. Additionally, a single seal can be utilized in order to seal base 24 with body 22. Also shown in FIG. 5b is protrusion 35, apex 62, and apex line 64.

In order to assemble fluid connector 20, first seals 42 and 44 are inserted into base 24. Then body 22 is inserted into base 24 and then washer 29 is used to secure body 22 within base 24. In a preferred embodiment, washer 29 is secured to base 24 via crimping of base 24 after both body 22 and washer 29 are inserted within body 24. It should be appreciated, however, that the use of different securement methods is possible and considered to be within the scope of the invention as claimed. For example, washer 29 can have screws threads operatively arranged on surface 29a with corresponding screw threads positioned on surface 24b of base 24.

Figure 6:
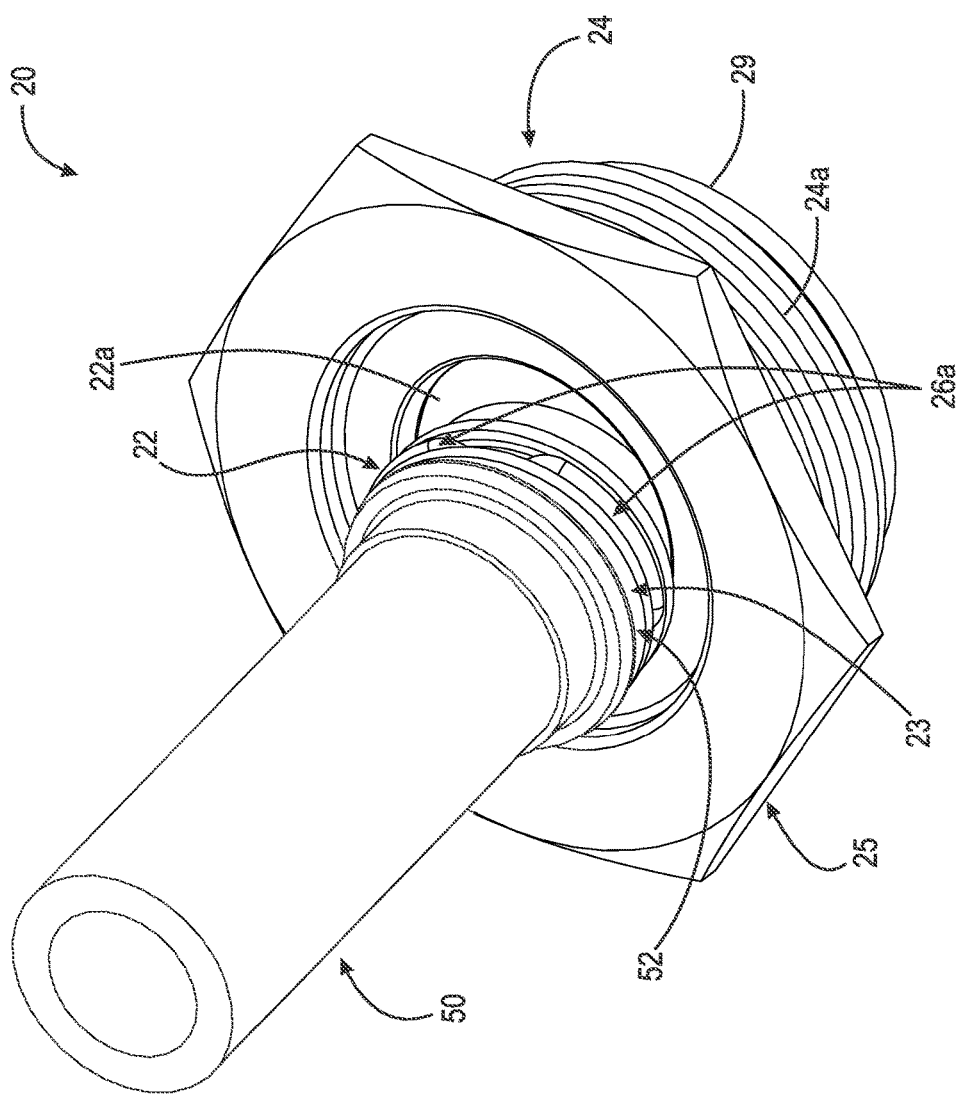

FIG. 6 is a perspective view of fluid connector 20 and tube 50. As shown in the figure, tube 50 inserts into through-hole 23 of body 22. A raised lip on tube 50 (not shown) engages retainer clip 26a and prevents tube 50 from being removed after insertion into through-hole 23. Rim 52 is arranged on tube 50 in order to position tube 50 properly within body 22. In a preferred embodiment, body 22, base 24, washer 29, and tube 50 are manufactured from a metal such as aluminum or steel. It should be appreciated, however, that the use of different types of materials is possible and considered to be within the scope of the present invention as claimed. For example, fluid connector 20 could be manufactured from injection molded plastic.

It will be appreciated that various aspects of the above-disclosed invention and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS 20 fluid connector
22 body
22a surface
22b surface
23 through-hole
24 base
24a surface
24b surface
25 rim
26a retainer clip
26b aperture
28 through-hole
29 washer
29a surface
29b surface
30 angled surface
30A section
30B section
31 groove
32 groove
33 rim
34 groove
35 protrusion
38 aperture
39 aperture
40 seal
42 seal
44 seal
46 seal
50 tube
52 rim
60 centerline
62 apex
64 apex line
66 end
68 axis
AD1 axial direction

What is claimed is:

1. A fluid connector, comprising:
   a base comprising a first through-hole concentrically positioned therein, said base comprising a first inner surface and a first outer surface, said base comprising a first annular groove and a second annular groove extending radially outward from said first inner surface;
   a first annular seal, said first annular seal located within said first annular groove;
   a second annular seal, said second annular seal located within said second annular groove;
   a washer positioned within said first through-hole, said washer having an inwardly facing partially spherical surface and an angled surface connected to the inwardly facing partially spherical surface, wherein said angled surface is arranged at least partially within the second annular groove, wherein the angled surface comprises a first section coplanar with an axis perpendicular to a centerline of the first through-hole and a second section arranged at an angle relative to the axis in a first axial direction toward the second annular seal, wherein the angle is less than 90 degrees, wherein the first annular seal is arranged on a first axial side of the second annular seal and the washer is arranged on a second axial side, opposite the first axial side, of the second annular seal; and, a body having a second through-hole positioned therein, said body comprising a second inner surface and a second outer surface, wherein said second outer surface is partially spherical in shape, comprising an apex, wherein said second outer surface of said body engages said first annular seal, said second annular seal, and said inwardly facing partially spherical surface of said washer, wherein said body is arranged to swivel within said first through-hole of said base, and to pass fluid through said second through-hole of said body.

2. The fluid connector as recited in claim 1, wherein said first annular seal is a rubber O-ring.

3. The fluid connector as recited in claim 1, wherein said second annular seal is a rubber O-ring.

4. The fluid connector as recited in claim 1, wherein said fluid connector further comprises a retainer clip secured to said body and arranged within said second through-hole.

5. The fluid connector as recited in claim 1, wherein said body is arranged to swivel in a range of approximately 0-25 degrees with respect to the centerline of said first through-hole.

6. The fluid connector as recited in claim 1, wherein said first outer surface further comprises screw threads.

7. The fluid connector as recited in claim 1, wherein a protrusion axially arranged between the first and second annular grooves aligns with said apex of said second outer surface of said body when said body is swiveled 0 degrees with respect to the centerline of said first through-hole.

8. The fluid connector as recited in claim 1, wherein said apex of said second outer surface of said body is arranged between said first annular seal and said second annular seal.

9. A fluid connector, comprising:
a base comprising a first through-hole concentrically positioned therein, said base comprising a first inner surface and a first outer surface, said base comprising a first annular groove and a second annular groove extending radially outward from said first inner surface;
a first annular seal, said first annular seal located within said first annular groove;
a second annular seal, said second annular seal located within said second annular groove;
a washer positioned within said first through-hole and arranged completely within said base, said washer having an inwardly facing partially spherical surface and an angled surface, wherein said angled surface is arranged at least partially within said second annular groove, wherein the angled surface comprises a first section coplanar with an axis perpendicular to a centerline of the first through-hole and a second section arranged at an angle relative to the axis in a first axial direction toward the second annular seal, wherein the angle is less than 90 degrees, wherein the first annular seal is arranged on a first axial side of the second annular seal and the washer is arranged on a second axial side, opposite the first axial side, of the second annular seal;
a body having a second through-hole positioned therein, said body comprising a second inner surface and a second outer surface, wherein said second outer surface is partially spherical in shape, comprising an apex, wherein said second outer surface of said body engages said first annular seal, said second annular seal, and said inwardly facing partially spherical surface of said washer, wherein said body is arranged to swivel within said first through-hole of said base, and to pass fluid through said second through-hole of said body, said first annular seal operatively arranged on a first side of said apex, and said second annular seal operatively arranged on a second side of said apex, said second side opposite said first side; and, a retainer clip fixedly secured to said body, said retainer clip positioned within said second through-hole.

10. The fluid connector as recited in claim 9, wherein said first annular seal is a rubber O-ring.

11. The fluid connector as recited in claim 9, wherein said second annular seal is a rubber O-ring.

12. The fluid connector as recited in claim 9, wherein said retainer clip secures a connector tube to said fluid connector.

13. The fluid connector as recited in claim 9, wherein a protrusion axially arranged between the first and second annular grooves aligns with said apex of said second outer surface of said body when said body is swiveled 0 degrees with respect to a centerline of said first through-hole.

14. The fluid connector as recited in claim 9, wherein said apex of said second outer surface of said body is arranged between said first annular seal and said second annular seal as said body is swiveled at the maximum amount of degrees with respect to the centerline of said first through-hole of said base.

15. A fluid connector, comprising:
a base comprising a first through-hole concentrically positioned therein, said base comprising a first inner surface and a first outer surface, said base comprising a first annular groove and a second annular groove extending radially outward from said first inner surface;
a protrusion operatively arranged between said first annular groove and said second annular groove;
a first annular seal, said first annular seal located within said first annular groove;
a second annular seal, said second annular seal located within said second annular groove;
a washer secured within said first through-hole, said washer having an inwardly facing partially spherical surface and an angled surface, wherein said angled surface is arranged at least partially in said second annular groove, wherein the angled surface comprises a first section coplanar with an axis perpendicular to a centerline of the first through-hole and a second section arranged at an angle relative to the axis in a first axial direction toward the second annular seal, wherein the first annular seal is arranged on a first axial side of the second annular seal and the washer is completely arranged on a second axial side, opposite the first axial side, of the second annular seal;
a body having a second through-hole positioned therein, said body comprising a second inner surface and a second outer surface, wherein said second outer surface is partially spherical in shape, wherein said second outer surface of said body engages said first annular seal, said second annular seal, and said inwardly facing partially spherical surface of said washer, wherein:
said washer is arranged to contain said second annular seal within the second annular groove on the first axial side;

said protrusion is arranged to contain said second annular seal within the second annular groove on the second axial side, opposite the first axial side; and, said body is arranged to swivel within said first through-hole of said base, and to pass fluid through said second through-hole of said body; and, a retainer clip fixedly secured to said body and axially displaced from said base, said retainer clip positioned within said second through-hole, said retainer clip securing a connector tube to said fluid connector.

16. The fluid connector as recited in claim 15, wherein said first annular seal and/or said second annular seal is a rubber O-ring.

17. The fluid connector as recited in claim 16, wherein said body further comprises a third seal arranged within said second through-hole.

18. The fluid connector as recited in claim 15, wherein said first outer surface further comprises screw threads.

19. The fluid connector as recited in claim 15, wherein said body abuts against said base when said body is swiveled at the maximum amount of degrees with respect to the centerline of said first through-hole of said base.

* * * * *